Figure 1:
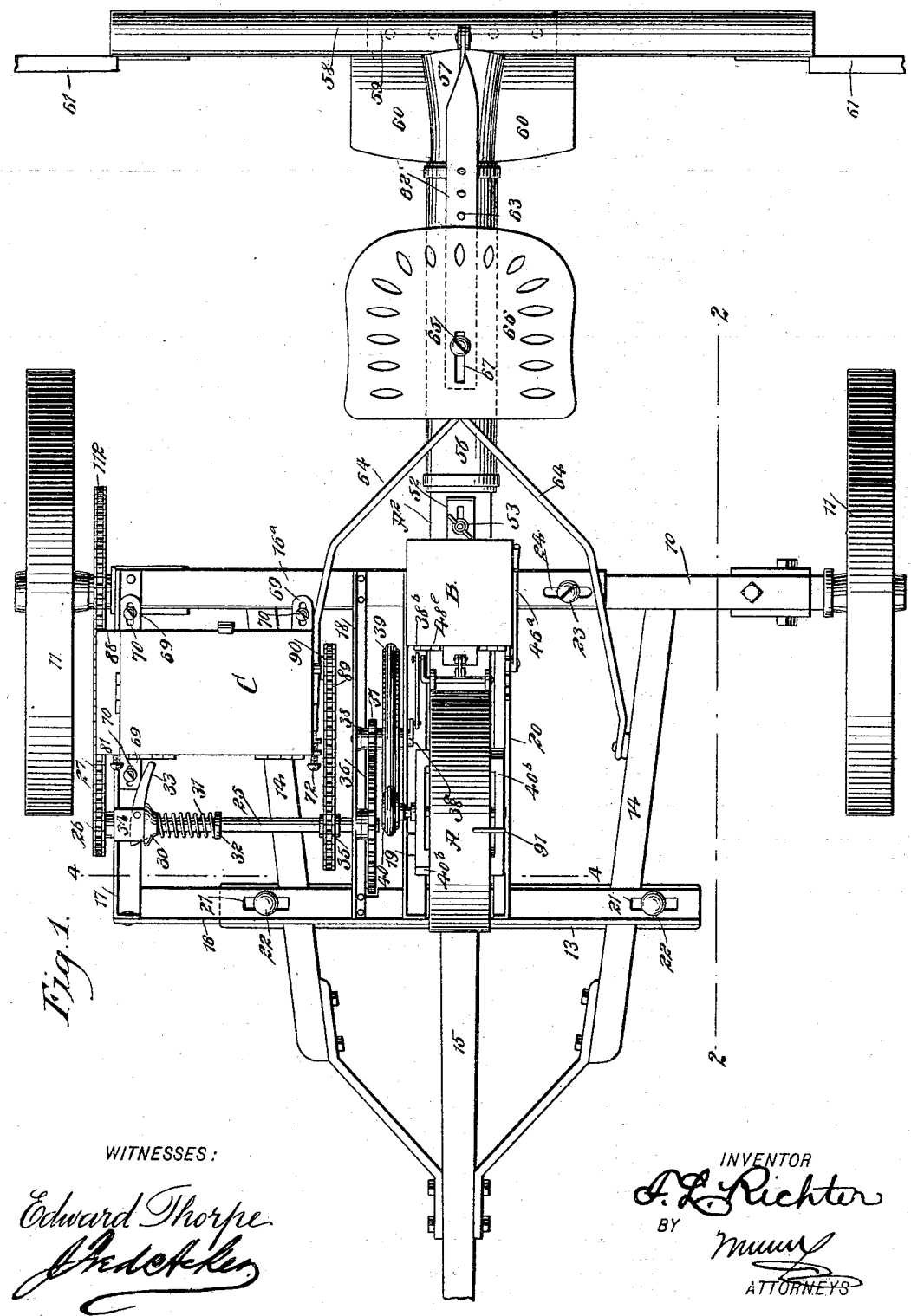

No. 637,666. Patented Nov. 21, 1899.
F. L. RICHTER.
POISON DISTRIBUTER.
(Application filed June 9, 1899.)

(No Model.) 3 Sheets—Sheet 1.

WITNESSES:
Edward Thorpe

INVENTOR
F. L. Richter
BY
ATTORNEYS

No. 637,666. Patented Nov. 21, 1899.
F. L. RICHTER.
POISON DISTRIBUTER.
(Application filed June 9, 1899.)
(No Model.) 3 Sheets—Sheet 2.
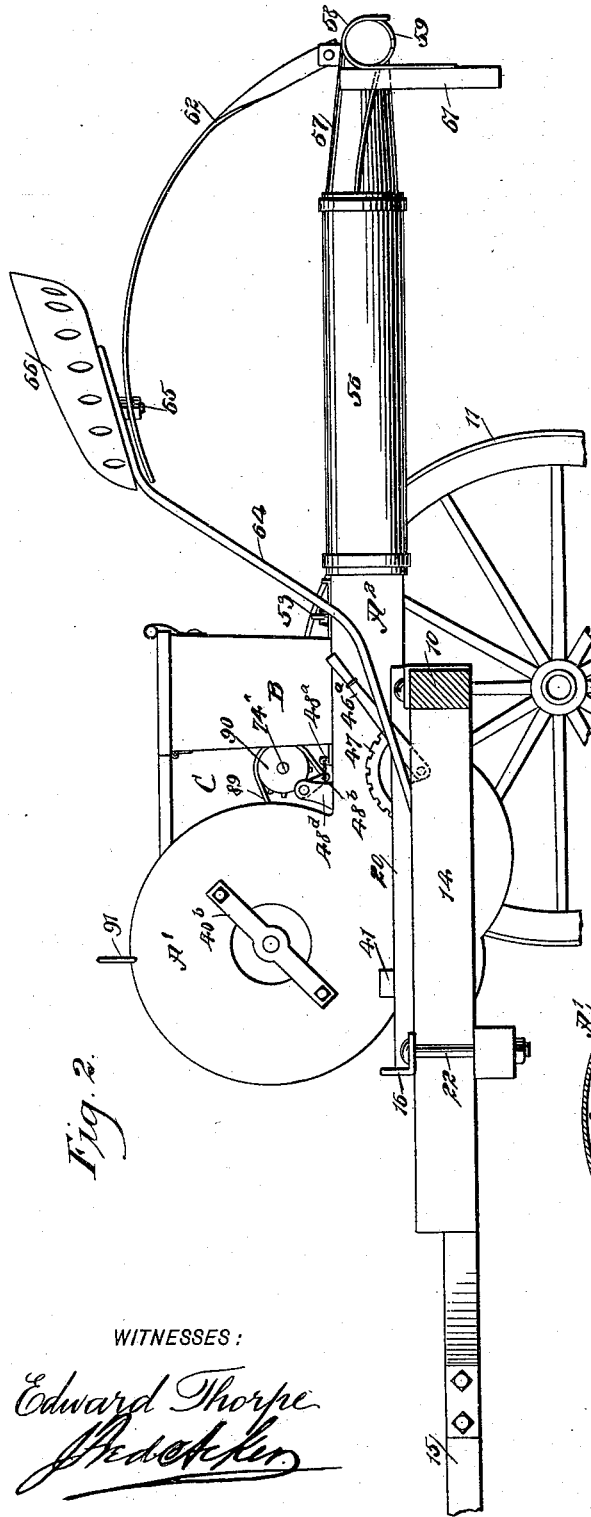
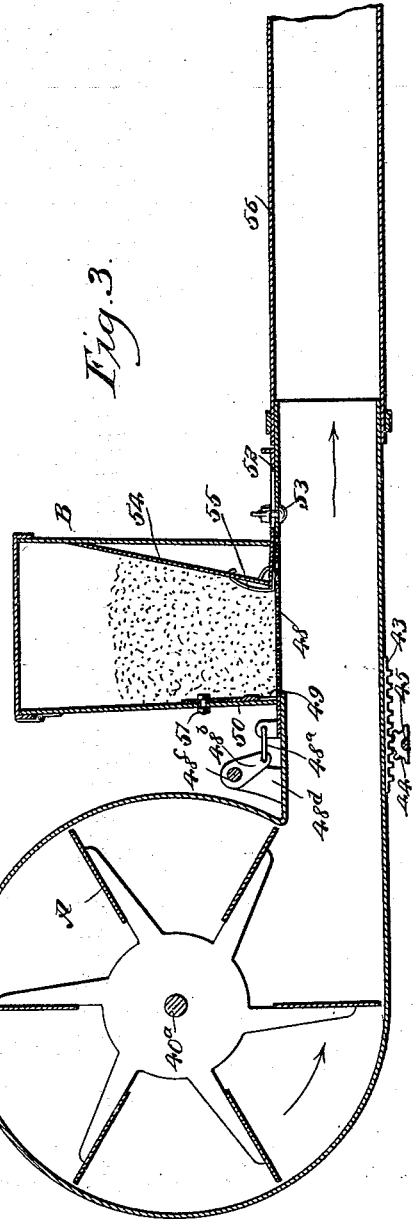
WITNESSES:
Edward Thorpe
INVENTOR
F. L. Richter
BY
ATTORNEYS No. 637,666. Patented Nov. 21, 1899.
F. L. RICHTER.
POISON DISTRIBUTER.
(Application filed June 9, 1899.)
(No Model.) 3 Sheets—Sheet 3.
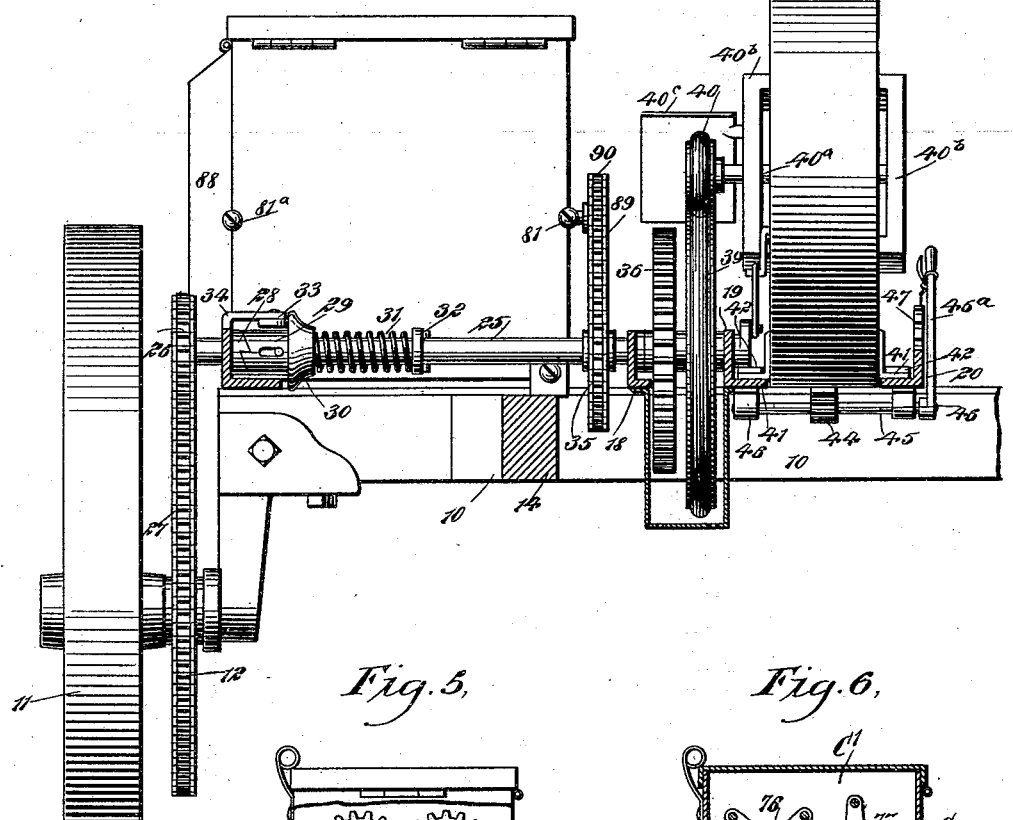
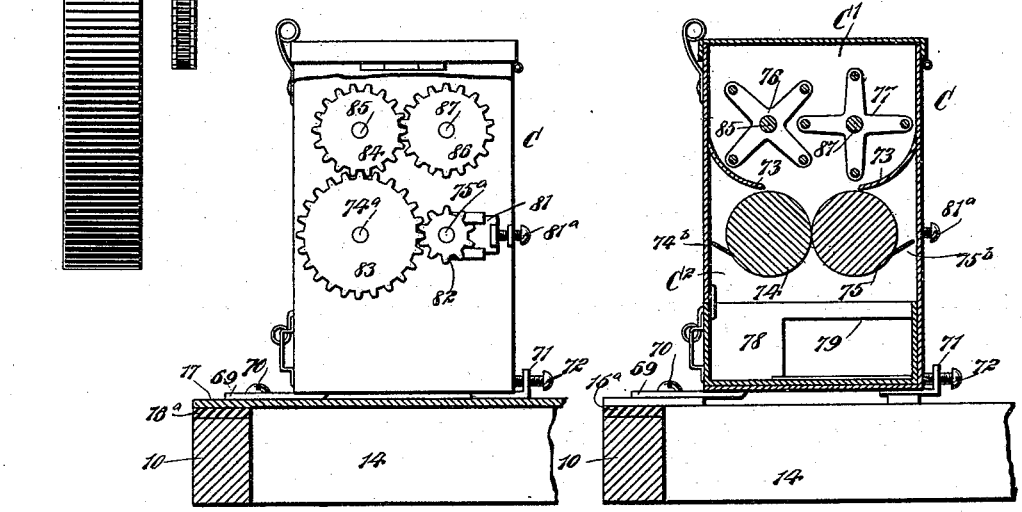
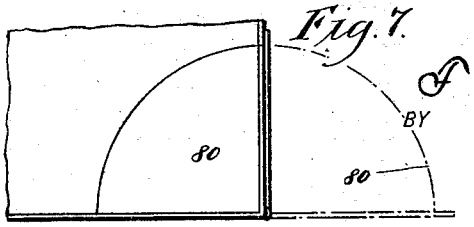
WITNESSES: Edward Thorpe
INVENTOR F. L. Richter
BY
ATTORNEYS
THE NORRIS PETERS CO., PHOTO-LITHO., WASHINGTON, D. C.

UNITED STATES PATENT OFFICE.

FRANK L. RICHTER, OF CUERO, TEXAS.

POISON-DISTRIBUTER.

SPECIFICATION forming part of Letters Patent No. 637,666, dated November 21, 1899.

Application filed June 9, 1899. Serial No. 719,934. (No model.)

*To all whom it may concern:*

Be it known that I, FRANK L. RICHTER, of Cuero, in the county of De Witt and State of Texas, have invented a new and Improved Poison-Distributer, of which the following is a full, clear, and exact description.

The object of the invention is to provide a machine for distributing poison upon vines and plants that will be under the complete control of one man and which in operation will not injure the plants being treated and which will also insure an equal distribution of poison simultaneously upon three to seven or more rows of plants.

Another object of the invention is to so construct the machine that the distributing-nozzle may be readily adjusted to pass over plants of different heights and whereby also the ingredients of the poison to be distributed may be thoroughly mixed or compounded in a receptacle independent of the distributing-receptacle during the period the machine is in operation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved machine. Fig. 2 is a vertical section through the axle, taken practically on the line 2 2 of Fig. 1, showing the main parts of the machine in side elevation. Fig. 3 is an enlarged vertical section through the blower and the distributing-receptacle of the machine. Fig. 4 is a transverse section taken practically on the line 4 4 of Fig. 1. Fig. 5 is an end view of the mixing-receptacle and shows the gearing for the crushing-rollers and mixing devices. Fig. 6 is a transverse section through the said mixing-receptacle, and Fig. 7 is an enlarged plan view of one corner of the pan adapted to receive the mixed material.

Any approved form of truck may be employed; but usually the truck is a two-wheeled one, and the truck illustrated in the drawings consists of an axle 10, provided with a ground-wheel 11 at each end, the right-hand ground-wheel being provided with an attached driving-gear 12, a front bar 13, and side bars 14, that converge at the front and are connected by braces with the pole or tongue 15.

The frame of the machine proper consists of a front angle-bar 16, a rear flat bar 16ª, that is over the axle, a right-hand side bar 17, also of angle-iron and similarly formed, and intermediate bars 18, 19, and 20, that extend from the front bar 16 to the rear bar 16ª. The front bar 16 of the main frame is provided with slots 21, and bolts 22 are passed through the slots and into the front bar 13 of the truck, and the rear bar 16ª of the main frame is provided at one end with a slot 24, and a bolt 23 is passed through this slot into the axle. Under this construction it will be observed that the frame may be fastened with three bolts and may be adjusted upon different styles of truck.

A drive-shaft 25 is journaled in the right-hand bar 17 of the frame and adjacent intermediate bar 18, and the drive-shaft is provided at its outer end with a sprocket-wheel 26, loosely mounted thereon, connected by a suitable belt 27 with the driving-gear 12 on the right-hand ground-wheel. The sleeve of the sprocket-wheel 26 is provided with a clutch-face 28, adapted for engagement with a clutch 29, mounted to slide upon the drive-shaft 25, yet turn therewith, the said clutch 29 being provided with a collar 30. A spring 31 engages with the collar 30 and normally holds the clutch 29 in engagement with the clutch-face of the sprocket-wheel 26, as shown in Fig. 4, the inner end of the spring having bearing against a suitable collar 32, located on the drive-shaft. A shifting lever 33 is fulcrumed upon a frame 34, that extends over the clutch, and when the lever 33 is carried in one direction it will so engage with the flange 30 as to take the clutch 29 out of engagement with the clutch-face of the sprocket-wheel 26, thus silencing the various operative parts of the machine to be hereinafter described.

A sprocket-wheel 35 is secured upon the drive-shaft 25 between the right-hand bar 17 of the frame and intermediate bar 18, adapted to drive a mixing apparatus C, and at the inner end of the drive-shaft 25 a large gear 36 is securely fastened, and this gear 36 meshes with a pinion 37, that is secured upon a shaft 38, journaled in the intermediate cross-bars 18 and 19, the shaft 38 being provided with a crank-arm 38$^a$, and the crank-arm 38$^a$ is connected with a link 38$^b$, adapted to drive a screen, to be hereinafter described, which screen is located at the bottom of the distributing-receptacle B, as is shown in Fig. 1. The shaft 38 is also provided with a friction-wheel 39, and the periphery of the friction-wheel is adapted to engage with a friction-wheel 40, secured upon a shaft 40$^a$, carrying a fan A, located in a suitable casing A'. The said shaft is journaled in brackets 40$^b$, attached to the sides of the fan-casing, as shown in Fig. 4, and the friction-wheel 40 is protected at the back by a shield 40$^c$, attached to the right-hand side of the fan-casing. The fan-casing is provided with a rearwardly-extending tubular extension A$^2$, and said fan-casing and its extension are laterally adjustable upon the frame, the fan-casing and extension being located between the cross-bars 19 and 20. The fan-casing and extension are provided with angle or L-shaped lugs 41, whose horizontal members are adapted to fit and slide under cleats 42, secured to said cross-bars 19 and 20, so that the friction-wheel 40 may be carried into and out of engagement with the driving friction-wheel 39. This adjustment of the fan-casing and extension is accomplished by locating a rack 43 upon the bottom of the extension of the fan-casing, as shown in Fig. 3, the said rack being engaged by a pinion 44, secured to a shaft 45, the shaft being journaled in suitable bearings 46, as shown in Fig. 4, and the shaft 45 is rotated through the medium of a hand-lever 46$^a$, secured to one end and provided with a proper thumb-latch for engagement with a rack 47, the said rack being secured upon the distributing-receptacle B.

The distributing-receptacle B is mounted upon the extension A$^2$ of the fan-casing, and that portion of the extension of the fan-casing below the receptacle is open. The bottom of said distributing-receptacle B consists of a screen 48, that has sliding movement on the extension of the fan-casing, said screen being attached by a link 48$^a$ to a crank-arm 48$^b$, as shown in Fig. 3, the crank-arm being mounted on a shaft 48$^c$, which shaft is journaled in suitable bearings 48$^d$, located upon the extension of the fan-casing, and the shaft 48$^c$ is provided at one end with a crank-arm 48$^e$, that is connected with the link 38$^b$, carried by the intermediate driving-shaft 38, heretofore referred to and as illustrated in Fig. 1. In this manner the screen 48 is reciprocated when the drive-shaft 25 is in operation, and the contents of the distributing-receptacle are sifted before entering the extension of the fan-casing and being blown to the rear of the machine. The upper surface of the screen or sieve 48 is kept clean by a brush 49, which consists of metal bristles attached to a plate 50, which plate is located at the front of said receptacle B and is adjusted by a bolt 51, which passes through a suitable slot in the front wall of the said receptacle B, as shown in Fig. 3.

The receptacle B is adapted to receive a large or a small quantity of material, as occasion may demand, and to that end an auxiliary back 54 is provided, having an inclination downwardly and forwardly, and the upper end of this back is held in engagement with the upper portion of the rear wall of said distributing-receptacle through the medium of a spring 55, that is attached to the auxiliary back 54 and to a slide 52, having lateral movement upon the fan-casing, one end being made to extend within the distributing-receptacle, and the slide is held in adjusted position by a suitable bolt 53 or a like device. A flexible pipe 56 is secured to the rear end of the extension of the fan-casing, and the rear end of this flexible pipe 56 is attached to a metal tube 57, which in its turn is connected with the central portion of a nozzle 58, that extends in direction of the sides of the machine. This nozzle is open at the bottom except at the center, where it is provided with an apertured bottom 59, and this apertured bottom insures the material conveyed to the nozzle being properly distributed upon the middle row of plants, the machine, as illustrated, being adapted to treat simultaneously three to seven or more rows of plants.

Horizontal guards 60 are secured to each side of the metal tube 57 and to the nozzle 58, and these guards are adapted to press tall plants downward, so that moisture shall not reach the flexible pipe or tube 56. Fans or fenders 61 are located at each end of the nozzle 58, extending horizontally with said nozzles, serving to protect the same from the sand and currents created by the ground-wheels 11.

The nozzle 58 is vertically adjusted through the medium of an arched bar 62, pivotally attached to the upper central portion of said nozzle, which arched bar is provided with apertures 63, said apertures being adapted to receive a bolt 65, that is likewise passed through a standard 64, provided with the seat 66, and the same bolt 65 secures the seat 66 to the standard 64. The seat is adjustable on the standard, since the bolt 65 passes through a slot 67 in the seat, as shown in Fig. 1. Thus it will be observed that when the machine is in operation the material in the distributing-receptacle B is sifted and delivered to the extension of the fan-casing and blown by the fan A to the nozzle 58, which directs the material to the plants.

An independent receptacle C is provided in which the ingredients to be used for distribution are mixed. This mixing-receptacle C is supported upon the right-hand bar 17 of the frame and the rear bar 16$^a$. The corners of the mixing-receptacle that rest upon the frame-bar 17 are provided with slotted lugs 69, and set-screws 70 are passed through the slots of the lugs, and similar lugs and set-screws are provided for the left-hand rear corner of the mixing-receptacle, as shown in Fig. 1; but at the left-hand forward corner the mixing-receptacle rests upon a bracket 71, which carries an adjusting-screw 72, and the object of this adjusting-screw is to shift the mixing-receptacle so that the driving-belt, to be hereinafter described, may be kept tightened.

Downwardly and inwardly curved plates 73 are located in the upper portion of the mixing-receptacle, as shown in Fig. 6, dividing the said receptacle into an upper compartment C' and a lower compartment $C^2$. A space intervenes the lower ends of the said plates 73, and one plate is located directly over a crushing-roller 74 and the other plate over a horizontally-alining parallel roller 75. The lower ends of the plates 73 serve to direct material to the crushing-rollers, and said rollers are provided with scrapers $74^b$ and $75^b$, located below the rollers in the chamber $C^2$. Stirring devices 76 and 77 are located in the upper chamber C', and each stirring device consists, preferably, of two stellated heads having their arms connected by rods, and a pan 78 is located in the bottom portion of the mixing-receptacle, which pan is provided at one corner with an opening 79, normally closed by an angle-plate 80, hinged to an outside corner of the pan, as shown in Fig. 7, and when this plate is opened out to the dotted position shown in Fig. 7 it forms a chute for conducting the mixed compound into the distributing-receptacle B. It will be understood that both receptacles B and C are provided with suitable covers having proper latches and that a suitable latch is also provided for the pan or drawer 78.

The trunnions $75^a$ of the forward crushing-roller 75 are journaled in suitable boxes 81, as shown in Fig. 5, the boxes being adjustable through the medium of suitable screws $81^a$, and one trunnion $75^a$ of the forward crushing-roller 75 is provided with an attached pinion 82, which meshes with a large gear 83, located upon the corresponding trunnion $74^a$ of the rear crushing-roller 74, and this gear 83 meshes with a gear 84, preferably smaller in diameter and secured upon the shaft 85 of the rear stirrer device, and the gear 84 meshes with a gear 86, preferably of like diameter, secured upon a shaft 87, belonging to the forward stirring device 77. Thus in operation it will be observed that the material to be distributed may be automatically mixed or compounded while distribution is going on, thus enabling a farmer to prepare his own material, which may be done at much less expense than if he were to purchase it already prepared.

The gearing for the rollers and stirring devices for the mixing-receptacle C are protected by a hood 88, that is hinged to the receptacle, so that the gearing may be exposed at any time. The train of gearing described is driven through the medium of a belt 89, that is passed over the sprocket-wheel 35 and over a sprocket-pinion 90, secured upon the left-hand trunnion of the rear crushing-roller 74. A guide-loop 91 is secured upon the fan-casing, through which the driving-reins may be passed.

One preparation that may be used for distribution is wood-ashes, sugar, and arsenic; but other ingredients may be employed, if desired.

Having thus described my invention, I claim as new and desire to secure by Letters Patent—

1. In a poison-distributer, a fan-casing, an extension from the fan-casing, a receptacle located upon and having communication with the extension of the fan-casing, a reciprocating screen located in the bottom portion of said receptacle, a brush for the said screen, and a nozzle connected with the said extension of the fan-casing, for the purpose described.

2. In a poison-distributer, a fan-casing, an extension from the fan-casing, a receptacle located on the extension of the fan-casing and having communication with the interior thereof, a screen mounted to reciprocate at the bottom of said receptacle, a brush adjustable to and from the screen, an adjustable inner wall for the said receptacle, and a nozzle connected with the extension of the fan-casing, as set forth.

3. In a poison-distributer, a fan, the casing whereof is provided with an extension, a receptacle mounted on said extension of the fan-casing, a screen mounted to reciprocate in the bottom of said receptacle, a nozzle having the bottom of its end portions open and its central portion apertured at the bottom, a flexible connection between the nozzle and the extension of the fan-casing, and means for vertically adjusting the nozzle, as described.

4. In a poison-distributer, a fan the casing whereof is provided with an extension, a receptacle mounted on said extension of the fan-casing, a screen mounted to reciprocate in the bottom of said receptacle, a nozzle having the bottom of its end portions open and its central portion apertured at the bottom, a flexible connection between the nozzle and the extension of the fan-casing, means for vertically adjusting the nozzle, guards laterally projected at the central forward portion of the nozzle, and wings serving as fenders, located at the forward end portions of said nozzle, for the purpose described.

5. In a poison-distributer, the combination, with a wheel-supported frame, a drive-shaft and means for operating said shaft, of a poison-distributing device operated from said shaft, and a mixing apparatus independent of the poison-distributing device, also operated from said shaft, as described.

6. The combination, with a frame adapted to be wheel-supported, a drive-shaft carried by said frame, and a friction-wheel operated by said drive-shaft, of a fan provided with a friction-pulley adapted for engagement with said friction-wheel, means for adjusting the fan-casing and carrying the friction-pulley to and from the friction-wheel, an extension of the fan-casing, a distributing-receptacle located upon and in communication with the extension of the fan-casing, a reciprocating screen located in the receptacle and operated from the said drive-shaft, and a nozzle connected with said extension of the fan-casing, for the purpose specified.

7. In a poison-distributer, the combination, with a drive-shaft and means for operating the same, of a mixing-receptacle provided with crushing-rollers and stirring devices, scrapers for the crushing-rollers, and a train of gearing for the stirring devices and rollers, driven from said drive-shaft, for the purpose specified.

FRANK L. RICHTER.

Witnesses:
WM. FROBESE, Jr.,
ANDREAS LÜER.